Oct. 25, 1938.  R. E. HELLMUND  2,134,513
AUTOMATIC TEMPERATURE CONTROL SYSTEM
Filed Feb. 8, 1935
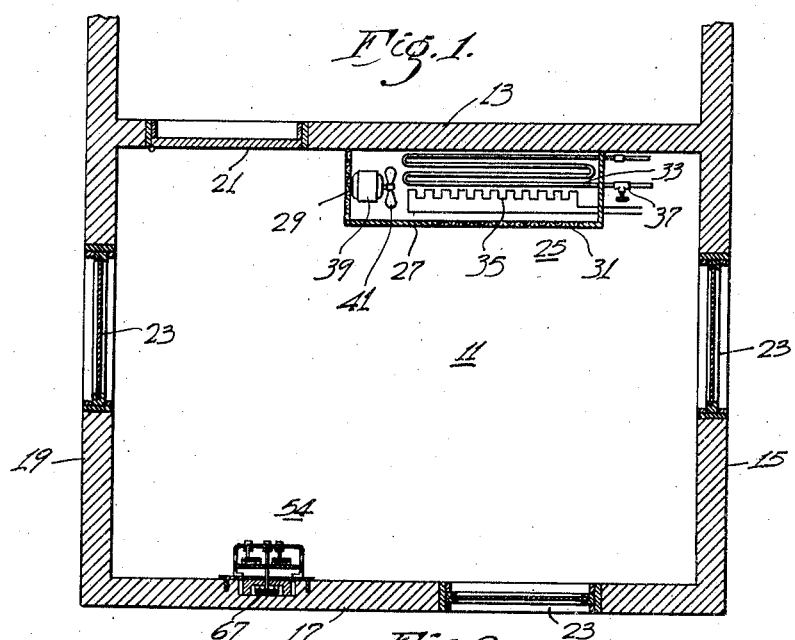
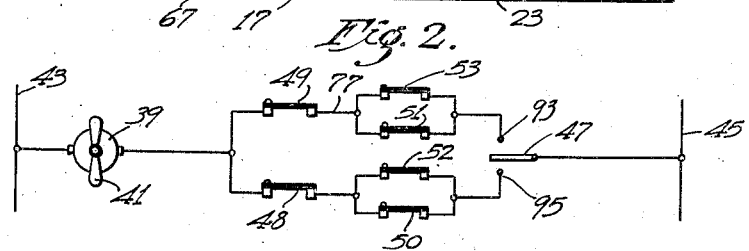
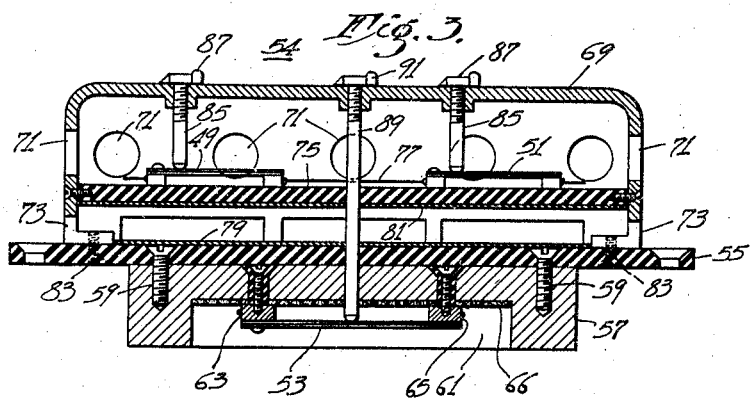
WITNESSES:
INVENTOR
Rudolph E. Hellmund.
BY
ATTORNEY Patented Oct. 25, 1938

2,134,513

UNITED STATES PATENT OFFICE 2,134,513

AUTOMATIC TEMPERATURE CONTROL SYSTEM

Rudolph E. Hellmund, Swissvale, Pa., assignor to Westinghouse Electric & Manufacturing Company, East Pittsburgh, Pa., a corporation of Pennsylvania Application February 8, 1935, Serial No. 5,548

19 Claims. (Cl. 236—1)

My invention relates to temperature control systems, and particularly, to such systems when applied to living or sleeping rooms.

An object of my invention is to provide a relatively simple and effective system embodying a minimum number of component parts, and effective to control the temperature of the air in a room to obtain the maximum degree of comfort therein.

Another object of my invention is to provide a temperature control system for an enclosed space, such as a living room or a bedroom, which embodies means for automatically controlling a temperature-varying means for the air in the room, in joint accordance with the temperature of a wall of the room and of the air therein, and also in accordance with the air temperature irrespective of the wall temperature.

Another object of my invention is to provide a relatively simple and effective automatic temperature control system for a room, that shall be so designed and shall so operate as to provide proper comfort for persons in such a room.

Another object of my invention is to provide a unitary structure for supporting a plurality of thermostats in such manner that they will be responsive to the temperature of certain parts or of the air, and will be unaffected by the temperature of other parts.

Other objects of my invention will either be apparent from the following description of a form of system embodying my invention now preferred by me, or will be specifically pointed out hereinafter.

In practicing my invention, I provide any desired means for varying the temperature of the air in a room, either a heating means or a cooling means, having operatively associated therewith a motor-driven blower for causing circulation of the air in the room through the temperature-varying device. I provide thermal control means for the motor actuating the fan or blower, which control the energization of the motor jointly in accordance with the temperature of a wall of the room and of the air therein, and solely in accordance with the air temperature irrespective of the wall temperature.

In the single sheet of drawings,

Figure 1 is a view in horizontal section, of a room illustrated schematically only, and shown as having the component parts of my system located therein;

Fig. 2 is a diagram of connections showing my improved control system; and

Fig. 3 is a view in horizontal section of a combination wall and air temperature thermostatic device.

It is well known that the outside walls of a building, such as a home, may be heated to a relatively high temperature during bright sunny summer days, so that even if the temperature of the air in the room, or of air moving through the room, is relatively low, the room or, rather the air therein, will still appear to be too warm for personal comfort. The reverse of this may occur on cold wintry days when the outside wall or walls may be cooled to a relatively low temperature, so that even if the air in the room has a relatively high temperature, it will still seem too cold for personal comfort. This is particularly true of sleeping rooms, and my invention aims to provide a temperature control system which will insure comfort for the occupant or occupants of such a room, or in fact, any other room to be occupied by one or more persons, so that they will feel very comfortable therein. Thus a temperature of 70° may be too warm in summer and may appear too cool in winter. While a difference in the humidity of the air may cause this in part, it is not the main cause. Thus in summer a person may receive heat by radiation from the room walls if they are at a sufficiently high temperature and a person may lose heat by radiation to the walls in winter when the walls are cold. It may be stated, in general, that about one third of the heat loss from a human body is by radiation, about one third is by convection and about one third by evaporation. The relatively large proportion of heat lost or received by radiation from or to a human body emphasizes the desirability of considering the temperature of the enclosing walls in any temperature control system applied to living or sleeping rooms.

Referring first to Fig. 1 of the drawing, I have there illustrated a room 11 enclosed by an inner wall 13 and three outer walls 15, 17 and 19, or any other suitable enclosing means. It is to be understood that the representation in Fig. 1 is general only, and that the room includes also a floor and a ceiling. Wall 13 may be provided with a suitable door 21, and walls 15, 17 and 19 may be individually provided with suitable windows 23.

A means for varying the temperature of the air in room 11 is indicated at 25 and may include a casing 27 having an inlet opening 29 for air, and an outlet 31 for the air after the same has had its temperature varied as by moving over a cooling coil 33, or a heating coil 35. It is to be understood that the representation of the air-cooling means 33 is schematic only and that I may employ any suitable type of air-cooling means, such as a plurality of convolutions of pipe, through which a suitable fluid refrigerant may be caused to flow and controlled by a valve 37. Similarly, the representation of the heating means 35 is schematic only and any suitable or desired type of electric heating element or of a steam heating coil, for example, may be utilized for my purpose.

The air in the room may be caused to circulate and to be moved through the temperature-varying means 25 by a motor-driven fan 39, which is to be understood as including a suitably constructed fan 41 and a motor for operating the same, together with supporting means therefor, all of a type now well known in the art.

I provide further, a suitable source of supply of electric energy for the motor of device 39, comprising supply circuit conductors 43 and 45 (see Fig. 2), a suitable three position main switch 47 being provided to primarily control the energization of the circuit of the motor-driven fan. The heating coil 35, if employed, may be connected to the supply-circuit conductors 43, 45 or to some other suitable source of electrical energy.

The thermally actuable means constituting a part of my control system includes a first air-temperature thermostat 49, a second air-temperature thermostat 51 and a wall-temperature thermostat 53, it being understood that the floor and the ceiling of room 11 are comprehended within the term "wall". The second air thermostat 51 and the wall thermostat 53 are connected in parallel-circuit relation relatively to each other, and are then connected in series circuit relation with the first air thermostat 49 and the motor of fan 39, all in a manner as shown in Fig. 2 of the drawing.

Since my invention contemplates the control of the means for varying the air temperature when used for heating as well as when used for cooling the same I provide a second set of air temperature and wall temperature thermostats. Thus if thermostats 49, 51 and 53 are operative to control the motor of the motor-driven fan when the cooling means 33 is energized, a second set of the thermostats 48, 50 and 52 are provided to be used to control the heating means 35. Thermostats 48 and 50 correspond to thermostats 49 and 51 and thermostat 52 corresponds to thermostat 53. The differences in the operation of the two sets of thermostats will be set forth hereinafter. While Fig. 1 shows a single plural-thermostat unit only, it is to be understood that two such units are employed, located in any part of the enclosure of the room.

Referring now to Fig. 3 of the drawing, I have there illustrated a preferred form of plural unit thermostatic assembly 54, two of which I utilize in my control system. The first unit 54 includes a base plate 55 made, preferably, of electric-insulating material, and having secured to the back side thereof, a recessed metal plate or member 57. The member 57 is held against one face of plate 55 by a plurality of screws 59. The recess 61 of plate 57 has located therein the wall thermostat 53, which is here shown as being of the bar or strip type, one end of the bar being fixedly secured to a base 63, while the other end thereof is free to engage with and be disengaged from a stationary contact member 65. The inner wall of recess 61 is provided with a heat-absorbing surface 66, which may be a black surface, capable of absorbing relatively large amounts of heat. The object of this, and the reason for its use, is to insure that the bimetal bar 53 shall respond to and closely follow the temperature of room wall 17, which, as shown in Fig. 1 of the drawing, is provided with a recess 67 therein to receive more particularly the member 57, the base 55 being suitably secured to the wall. The design and construction of this part of the plural member thermostatic control unit are such that bimetal bar 53 will follow closely the temperature variations of the wall 17 and also that it will be substantially unaffected by the temperature of the air in room 11. It may receive its heating or cooling largely by radiation from the wall or to the wall, respectively.

A casing or cover 69 is located against the other surface of plate 55 (inside the room 11), this cover member being preferably made of metal and provided with openings 71 and 73 in each wall thereof, so that air in the room may flow through these openings and through the cover 69. I provide, further, an intermediate wall or partition 75 of heat-insulating material, located in the cover 69 substantially parallel to and intermediate the ends thereof, between the openings 71 and 73 on the respective sides of the casing 69, substantially as shown in Fig. 3 of the drawing.

The first air-temperature thermostat 49 is located on plate 75 in one half of the casing, while the second air-temperature thermostat 51 is also mounted against the plate 75 in the other half of the casing, the two thermostats being connected in series circuit relation by a short lead 77 in a manner well known in the art. The other connections between the three thermostatic switches 49, 51 and 53 are indicated schematically in Fig. 2 of the drawing.

It will be noted that plate 75 fits closely within the sidewalls of the cover 69 to provide two chambers therein. A relatively thin plate 79 of heat-reflecting material, such as highly polished metal, is located against the outer or room-facing surface of plate 55 and held thereagainst by any suitable means not shown, while a similar heat-reflecting plate 81 is located against the adjacent face of plate 75 against which it is held by any suitable or desired means. The cover member 69 is held in its proper operative position against plate 55 by a plurality of short machine screws 83, or by any other equivalent means.

Since it is desired to be able to adjust the thermostatic switches to operate at different temperatures, I have indicated adjusting means for each of these thermostats as including a stud 85, in the case of thermostats 49 and 51, having a screw-threaded portion fitting into and extending through a part of the cover 69, which studs are adjustable by indicating handles 87, while switch 53 is provided with a longer stud 89, actuable by an indicating arm 91. The indicating arms 87 and 91 may, of course, move over a scale of temperature, whereby the operator may know what adjustment is effected by his manipulation of the actuating and indicating arms associated with the respective thermostatic switches. It is to be here noted that the showing of the three adjusting means for the respective thermostatic switches is schematic only, and that any other equivalent means adapted to adjust the operating temperature values of the respective thermostatic switches, may be employed by me.

A second plural-thermostat unit is provided and includes, in addition to the thermostats 48, 50 and 52, parts similar to those hereinbefore described for unit 54. The thermostats 48, 50 and 52 are however so designed and constructed that instead of opening the circuit controlled thereby upon reduction of temperature, they will effect disengagement of their cooperating contact members upon an increase of temperature, as will be hereinafter set forth.

Let it be assumed that the cooling system 33 is made operative while the heating coil 35 is deenergized, or otherwise rendered inoperative. Let it further be assumed that the first air-temperature thermostat 49 of unit 54 has been adjusted to disengage its cooperating contact members at a temperature of substantially 70° F., while the second air-temperature thermostat has been adjusted to effect disengagement of its cooperating contacts at substantially 75° F., and the wall-temperature thermostat 53 has been adjusted to effect disengagement of its cooperating contacts at a temperature of substantially 80° F.

When the temperatures of the respective thermostatic switches are above these values, and assuming that the switch 47 has been moved from its neutral position to a position where it engages contact terminal 93 electrically connected to thermostats 51 and 53, the air-moving means 39 will be energized, since the three thermostatic switches 49, 51 and 53 will all be in their closed positions, as shown in Fig. 2. The air in the room will, therefore, be caused to circulate and, while I have shown a specific location of the temperature-varying means 25, I wish it to be understood that I do not desire to be limited thereto, but that it may be located anywhere in the room 11 or outside the room. the main consideration being that when it is operative, it will cause a circulation of the air in or from the room into, through and out of the temperature varying means 25. It is, therefore, evident that some of the air circulating in the room will enter the opening or openings 73 of the cover 69, flow through the space between plates 79 and 81, and out through the other opening or openings 73 in the cover. Air will also flow through the cover between the top thereof and plate 75, entering through the opening or openings 71 in one side, and then leaving through the openings 71 in the other side. The effect of the flat heat-reflecting surfaces 79 and 81 will be to provide a layer of heat insulation between thermostat 53 and thermostats 49 and 51, the heat-insulating plate 75 also adding to this effect, to thereby insulate the air temperature thermostats from the wall temperature thermostat to cause the respective thermostats to follow very closely the air temperature and the wall temperature, respectively, as desired.

If the temperature of the first air thermostat 49 is reduced to a value below 70° F., it will operate to disengage its contact members, thereby shutting down the cooling system by deenergizing the motor irrespective of whether the temperature of the wall has dropped to a value only slightly above 80°. It is evident that the temperatures of the two air temperature thermostats will be substantially the same, but even though the second air temperature thermostat 51 alone would open, (when the air temperature drops below 75° F.) the motor-energizing circuit would still remain closed, since a circuit therefor would be provided by the first air temperature thermostat 49, and the wall temperature thermostat 53.

If it should happen that the temperature of the wall were to drop below its operative value of 80°, and if the temperature of the air in the room were to reach a value of, say, 74° or 73° F., both thermostatic switches 53 and 51 would operate to disengage their contact members to thereby deenergize the air-moving means 39. Thus, further operation of the air cooling system would be interrupted at least for a time, even though the air temperature had not yet dropped to substantially 70°.

When it is desired to use the system to heat the air in the room, as may be necessary in winter time, the cooling means 33 will be suitably deenergized or rendered ineffective and the heating means 35 will be energized or rendered effective by suitable control means.

The switch 47 is manually moved to engage contact terminal 95 to thereby connect the second plural-thermostat unit in circuit with the motor driven fan 39. The first air temperature thermostat 48 may be adjusted to effect disengagement of its contact members when its temperature exceeds say 76° F., the second air temperature thermostat 50 may be adjusted to open its circuit at temperatures above 70° F. and the wall temperature thermostat 52 may be adjusted to open its circuit at temperatures above 65° F.

It is evident that if, for any reason, the temperature of the air in the room has been heated to a value but slightly exceeding 76° F., thermostatic switch 48 will disengage its cooperating contact members and thereby deenergize the air moving means, even though the temperature of the wall may not yet have reached the value of substantially 65°.

On the other hand, if it be assumed that the temperature of the wall has reached a value of, say, 66° and the temperature of the air has reached a value of, say, 71°, thermostats 50 and 52 will interrupt their respective circuits to thereby cause deenergization of the air moving means 39. This operation will occur even though the temperature of the air, as has just been stated, is only 71°, so that the first air temperature thermostat 48 has not yet moved to its open position.

The temperature control system embodying my invention thus provides means for deenergizing an air-moving means if the temperature of the air in the room has reached a relatively high value, irrespective of whether the temperature of the wall has reached a certain lower value, when the heating system is in use. Conversely, during hot weather when the cooling system is in use, the air-moving means is deenergized when the temperature of the air has been reduced to a certain value, even though the temperature of the wall is still relatively high. This insures that the effect of either an exceedingly hot or an exceedingly cold wall will not make itself felt to too great an extent to endanger the comfort of persons sitting or otherwise occupying the room.

While I have given specific temperature values at which the respective thermostats are to operate, I do not wish to be limited thereto, since these values may be varied in accordance with the desires of the occupant or occupants of the room.

The system embodying my invention is, therefore, operative to control a temperature-varying means by the joint or cooperative action of an air-temperature and a wall-temperature thermostat, as well as by the sole action of another air-temperature thermostat, the operating temperature values of the three thermostats differing one from the other.

My invention includes also in its broadest aspect, a thermostatic assembly having highly desirable means therein for cooperating with the other parts of the system to effect the desired type of control of the temperature of a room.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A temperature control system for a space enclosed by walls, comprising, in combination, means for affecting the temperature of the air, a first thermostat responsive to air temperature, a second thermostat responsive to the temperature of a wall, said first and second thermostats co-operating to jointly control the temperature-affecting means and a third thermostat responsive to air temperature for controlling the temperature-affecting means dependent upon the position of said other thermostats.

2. A temperature control system for a space enclosed by walls, comprising, in combination, means for changing the temperature of the air in the enclosed space, a first thermostat responsive to air temperature, a second thermostat responsive to wall temperature, and a third thermostat responsive to air temperature, said first and second thermostats being jointly cooperative to deenergize the temperature-changing means and the third thermostat being effective alone to deenergize the temperature-changing means.

3. A temperature control system for a space enclosed by walls, comprising, in combination, means including a motor-driven fan for changing the temperature of the air, a first thermostat embedded in the wall and responsive to the temperature thereof, a second thermostat responsive to air temperature, a third thermostat responsive to air temperature, and electrical conductors connecting the first and second thermostats in parallel with each other and in series with the third thermostat and the motor of said fan.

4. A temperature control system for a space enclosed by walls, comprising, in combination, a temperature-varying device, a motor-driven fan for circulating air through the temperature-varying device and through the enclosed space, and temperature-controlled means for deenergizing the motor selectively in joint dependence on the temperatures of the air and of the wall and in sole dependence on the temperature of the air, said temperature values differing from each other.

5. A temperature control system for a space enclosed by walls, comprising, in combination, a heating means, a motor-driven fan to circulate air through the heating means and through the enclosed space, a first and a second air-temperature thermostat and a wall-temperature thermostat, and electric connections between the respective thermostats and the motor to selectively control the energization of the motor in joint dependence on the air and wall temperature and in dependence on the air temperature affecting said second thermostat and the position of the other thermostats.

6. A system as set forth in claim 5, in which the last mentioned control of the motor is effected at a higher temperature than its control jointly by the wall and air temperature.

7. A temperature control system for a space enclosed by walls, comprising, in combination, a temperature-varying means, a motor driven fan to circulate air through the temperature varying means and through the enclosed space, a first thermostat responsive to wall temperature, a second and a third thermostat responsive to air temperature, a supporting means for all of said thermostats, said supporting means including means to so support the wall thermostat that it will respond only to wall temperature and to so support the air thermostats that they will respond only to the air temperature, and conductors connecting the thermostats and the motor.

8. A temperature control system for a space enclosed by walls comprising, in combination, a temperature varying means, a motor-driven fan to circulate air through the temperature-varying means and through the enclosed space, a first thermostat responsive to wall temperature, a second and a third thermostat responsive to air temperature, a plate of heat-insulating material secured against the wall, an inwardly-recessed metal member at the inside surface of the plate of heat-insulating material and located in a recess in the wall, means securing the wall thermostat in the recess in the metal member, a supporting plate for the two air thermostats spaced from the heat insulating plate, and a cover and supporting member for the supporting plate having air-circulating openings therein in back and in front of the air-thermostat-supporting plate.

9. A temperature control system for a space enclosed by walls, comprising in combination, a temperature-varying means, a motor-driven fan to circulate air through the temperature-varying means and through the enclosed space, a first thermostat responsive to wall temperature, a second and a third thermostat responsive to air temperature, a plate of heat-insulating material secured against the wall, a metal plate having an inner heat-absorbing surface and means to secure the wall thermostat to the metal plate adjacent to but spaced from the heat-absorbing surface, a supporting plate for the two air thermostats spaced from the heat-insulating plate, heat-reflecting surfaces on the outer surface of the heat-insulating plate and on the inner surface of the air thermostat supporting plate, and conductors electrically connecting the thermostats and the motor.

10. A system as set forth in claim 9 which includes a combined cover and supporting member for the air thermostat supporting plate having a plurality of openings therethrough to permit air from the enclosed space to circulate past the air thermostats.

11. A temperature control system for a chamber defined by enclosing walls, comprising, in combination, a means for moving and varying the temperature of the air in a chamber, a first thermostat actuated in accordance with the temperature of the air in the chamber, a second thermostat actuated in accordance with the temperature of the air in the chamber, and a third thermostat actuated solely in accordance with the temperature of one of said walls, the first thermostat alone effecting deenergization of the air-moving means upon the air temperature reaching a certain value and the second and third thermostats jointly effecting deenergization of the air moving means when the temperatures of the air and of the wall reach certain other fixed and different values.

12. A temperature control system for a chamber defined by enclosing walls, one of said walls having a recess therein, comprising in combination, a means for thermally affecting the air in the chamber, a motor-driven fan for circulating air from the chamber through the thermal air-affecting means and into the chamber, a first air temperature thermostat operative at a certain temperature value of the air, a wall temperature thermostat located in the recess in the wall and operative at a value of the wall temperature differing from that of the first air temperature thermostat, and a second air temperature thermostat operative at another temperature value of the air, said first air-temperature thermostat and the wall-temperature thermostat being jointly cooperative to deenergize the motor, and the second air-temperature thermostat being effective alone to deenergize the motor.

13. A temperature control system for a chamber defined by a plurality of walls, comprising in combination, an air cooling device for the chamber, a plural-unit thermally actuable means for deenergizing the air-cooling means when the respective temperatures of one of said walls and of the air in the chamber are both below certain values, said temperature values being different from one another, and a thermostat for deenergizing the air-cooling means when the air temperature is at a value lower than the first-named temperatures of the wall and of the air.

14. A system as set forth in claim 15 and including other thermally-actuated means for deenergizing the air cooling means when the temperature of the air in the chamber drops below a certain value irrespective of the wall temperature, said last-named air temperature value being lower than the first-named temperatures of the wall and of the air.

15. A temperature control system for a chamber defined by a plurality of walls, one of said walls having a recess therein, comprising in combination, a means for heating air in the chamber, a motor-driven fan for circulating the air in the chamber through the air heating means, a first air temperature thermostat operative at a certain temperature value of the air, a wall temperature thermostat located in the recess in the wall and operative at a wall temperature value different than that of the first air temperature thermostat, and a second air temperature thermostat operative at a different and higher temperature value of the air, said first air temperature thermostat and the wall temperature thermostat being jointly cooperative to deenergize the motor, and the second air temperature thermostat being effective alone to deenergize the motor.

16. A plural-thermostat device comprising in combination, a base plate adapted to be secured against a recessed wall, a thermostat supported by the base plate in the recess to be controlled by the wall temperature, at least one air thermostat operatively supported by the base plate at the front thereof to be controlled by air temperature and means located between the thermostats to reduce heat interchange therebetween.

17. A plural-thermostat device, comprising in combination, a base plate adapted to be secured against a recessed wall, an apertured cover for the front of the base plate, a thermostat at the rear of the base plate in the wall recess to be controlled by the wall temperature, a second thermostat located in the cover at the front of the base plate to be controlled by the air temperature, means operatively associated with the thermostat at the rear of the base plate to ensure its being actuated solely by wall temperature and means operatively associated with the second thermostat to ensure its being actuated solely by air temperature.

18. A temperature-control system for a space enclosed by walls comprising, in combination, means for affecting the temperature of the air, a first thermostat responsive to air temperature, a second thermostat responsive to the temperature of a wall, said thermostats cooperating to jointly control the temperature-affecting means, and a third thermostat responsive to one of said temperatures for controlling said temperature-affecting means dependent upon the position of said other thermostats.

19. A temperature control system for a space enclosed by walls, comprising, in combination, means for changing the temperature of the air in the enclosed space, a first thermostat responsive to air temperature, a second thermostat responsive to wall temperature, and a third thermostat also responsive to one of said temperatures, said first and second thermostats being jointly cooperative to deenergize the temperature-changing means and the third thermostat being effective alone to deenergize the temperature-changing means.

RUDOLPH E. HELLMUND.